(12) United States Patent
Wang et al.

(10) Patent No.: US 12,503,382 B2
(45) Date of Patent: Dec. 23, 2025

(54) DEVICE AND METHOD FOR TREATING URBAN DOMESTIC SEWAGE BASED ON TWO-STAGE COMBINED PROCESS OF PARTIAL DENITRIFICATION-ANAMMOX

(71) Applicant: Beijing University of Technology, Beijing (CN)

(72) Inventors: Bo Wang, Beijing (CN); Yuqing Ma, Beijing (CN); Xiaodi Li, Beijing (CN); Shuo Wang, Beijing (CN); Wen Wang, Beijing (CN); Tan Jiang, Beijing (CN)

(73) Assignee: Beijing University of Technology, Beijing (CN)

( * ) Notice: Subject to any disclaimer, the term of this patent is extended or adjusted under 35 U.S.C. 154(b) by 415 days.

(21) Appl. No.: 17/947,306

(22) Filed: Sep. 19, 2022

(65) Prior Publication Data
US 2023/0100166 A1   Mar. 30, 2023

Related U.S. Application Data

(63) Continuation of application No. PCT/CN2021/133875, filed on Nov. 29, 2021.

(51) Int. Cl.
*C02F 3/30* (2023.01)
*C02F 3/12* (2023.01)
*C02F 3/28* (2023.01)

(52) U.S. Cl.
CPC ............ *C02F 3/307* (2013.01); *C02F 3/1263* (2013.01); *C02F 3/2846* (2013.01);
(Continued)

(58) Field of Classification Search
CPC ...... C02F 3/307; C02F 3/1263; C02F 3/2846; C02F 2209/06; C02F 2209/08;
(Continued)

(56) References Cited

FOREIGN PATENT DOCUMENTS

CN   201598220 U  * 10/2010
CN   202038943 U  * 11/2011
(Continued)

OTHER PUBLICATIONS

Machine-generated English translation of CN 110563271, generated on Dec. 27, 2024.*
(Continued)

*Primary Examiner* — Fred Prince
(74) *Attorney, Agent, or Firm* — Hawaii Patent Services; Nathaniel K. Fedde; Kenton N. Fedde

(57) ABSTRACT

A device and method for treating urban domestic sewage based on a two-stage combined process of partial denitrification-anammox belong to the field of biological sewage treatment. The device includes a raw water tank, a sequencing batch biofilm reactor (SBBR), an intermediate water tank, an up-flow anaerobic sludge bed (UASB) and a water outlet tank. A part of urban domestic sewage enters the SBBR and is mixed with residual sewage in the last cycle, a partial denitrification-anammox reaction is carried out under a stirring condition to remove nitrate nitrogen and a part of ammonia nitrogen, followed by a nitrification under an aeration condition to completely convert ammonia nitrogen into nitrate nitrogen, and effluent enters the intermediate water tank; and the other part of the urban domestic sewage is mixed with the effluent of the SBBR and continuously enters the UASB, and nitrite nitrogen, which is generated by nitrate nitrogen reduction, and ammonia nitrogen, are removed by means of anammox. According to the present invention, with no need of adding an external carbon source, organic matters in sewage can be effectively removed, the nitrogen removal efficiency of urban domestic sewage is improved, and efficient and low-consumption nitrogen removal is realized.

2 Claims, 1 Drawing Sheet

(52) U.S. Cl.
CPC ...... *C02F 2209/06* (2013.01); *C02F 2209/08* (2013.01); *C02F 2209/14* (2013.01); *C02F 2209/15* (2013.01); *C02F 2209/16* (2013.01); *C02F 2209/22* (2013.01); *C02F 2209/38* (2013.01); *C02F 2209/44* (2013.01); *Y02W 10/10* (2015.05)

(58) Field of Classification Search
CPC .............. C02F 2209/14; C02F 2209/15; C02F 2209/16; C02F 2209/22; C02F 2209/38; C02F 2209/44; Y02W 10/10
USPC ....... 210/605, 606, 615, 616, 617, 630, 631, 210/903, 252, 259
See application file for complete search history.

(56) References Cited

FOREIGN PATENT DOCUMENTS

| CN | 107487847 | A | * | 12/2017 | .............. | C02F 3/305 |
|---|---|---|---|---|---|---|
| CN | 109809562 | A | * | 5/2019 | | |
| CN | 110002592 | A | * | 7/2019 | .............. | C02F 3/307 |
| CN | 110217889 | A | * | 9/2019 | .............. | C02F 3/307 |
| CN | 110563271 | A | * | 12/2019 | .............. | C02F 3/28 |
| CN | 112390361 | A | * | 2/2021 | .............. | C02F 3/301 |
| CN | 113800637 | B | * | 3/2023 | | |
| EP | 3747836 | A1 | * | 12/2020 | .............. | C02F 9/00 |

OTHER PUBLICATIONS

Machine-generated English translation of CN 110002592, generated on Dec. 27, 2024.*
Machine-generated English translation of CN 110217889, generated on Dec. 27, 2024.*
Machine-generated English translation of CN 109809562, generated on Dec. 27, 2024.*
Machine-generated English translation of CN 202038943, generated on Dec. 27, 2024.*
Machine-generated English translation of CN 201598220, generated on Dec. 27, 2024.*
Machine-generated English translation of CN 113800637, generated on Dec. 27, 2024.*
Machine-generated English translation of CN 112390361, generated on Aug. 11, 2025.*
Machine-generated English translation of CN 107487847, generated on Aug. 11, 2025.*

* cited by examiner

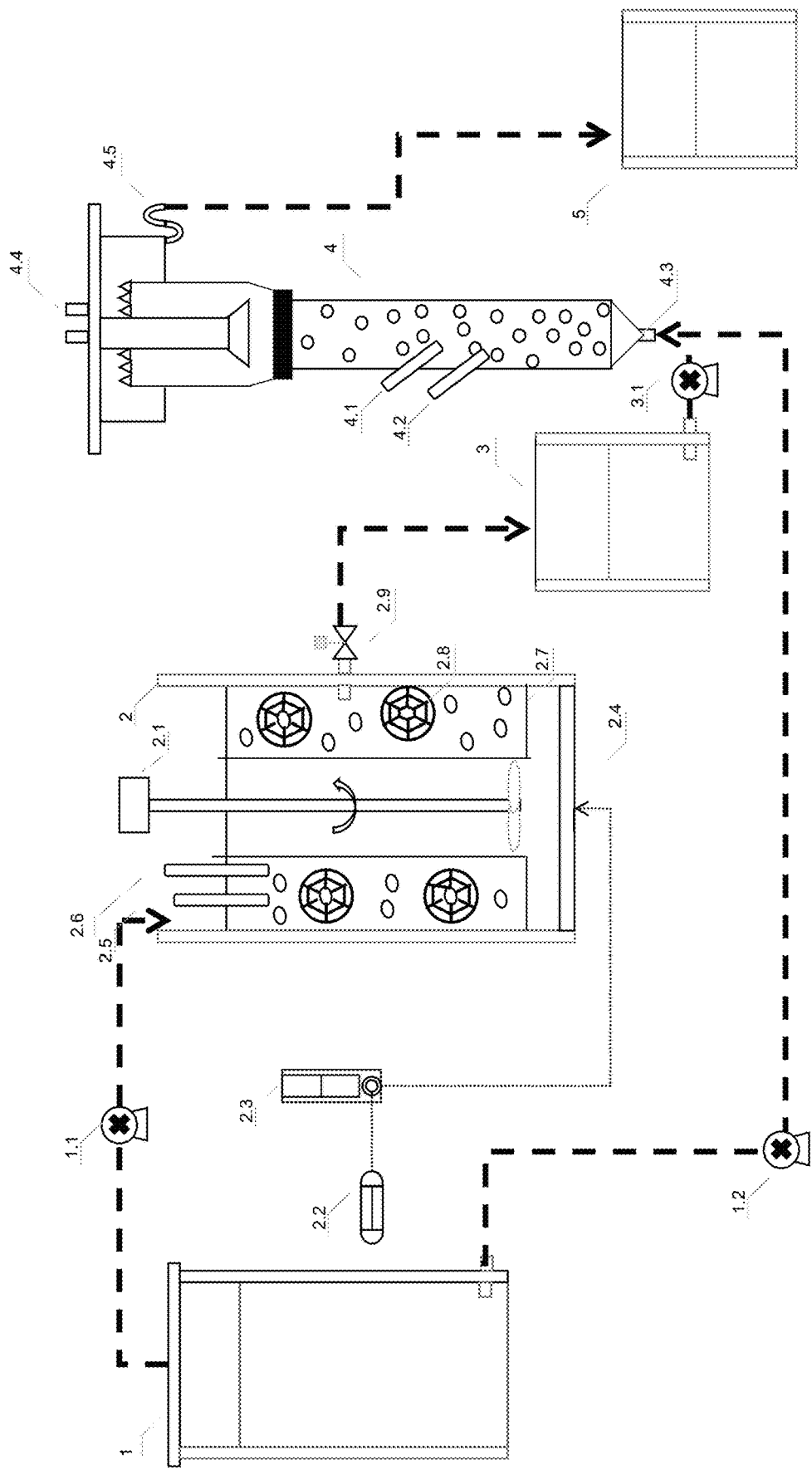

DEVICE AND METHOD FOR TREATING URBAN DOMESTIC SEWAGE BASED ON TWO-STAGE COMBINED PROCESS OF PARTIAL DENITRIFICATION-ANAMMOX

TECHNICAL FIELD

The present invention relates to a device and method for treating urban domestic sewage based on a two-stage combined process of partial denitrification-anammox, belongs to the field of biological sewage treatment, and is suitable for advanced nitrogen removal of urban domestic sewage with low C/N ratio.

BACKGROUND

In the process of urban domestic sewage treatment, nitrification-denitrification is a commonly used technology in sewage treatment plants today. However, due to relatively low carbon and nitrogen in urban domestic sewage, nitrification-denitrification requires more carbon sources, resulting in low nitrogen removal efficiency. Therefore, additional carbon sources are often required, which does not meet the requirements of sustainable development.

In recent years, the anammox process has received extensive attention due to its energy-saving properties. This reaction uses nitrite as an electron acceptor to oxidize ammonia nitrogen to nitrogen for nitrogen removal, while producing 11% of nitrate nitrogen. The reaction is carried out under anaerobic conditions without carbon sources, which meets the requirements of sustainable development. However, there are still difficulties in the application of an anammox reaction to nitrogen removal of urban domestic sewage. For example, anammox bacteria grow slowly, have a long generation cycle, and are sensitive to the environment; the supply of nitrite is unstable; and at the same time, the anammox reaction will produce a small amount of nitrate nitrogen to make it difficult to achieve advanced nitrogen removal of sewage, etc.

Either partial nitrification or partial denitrification can be used as a way to generate nitrite, so both are usually used in combination with the anammox reaction. If anammox is combined with partial nitrification, although carbon source dosage and aeration volume can be saved, about 11% nitrate nitrogen will still be produced and additional carbon capture pretreatment are needed before the process to help remove organic matters; the control is complex and it is difficult to stably elutriate/inhibit NOB. However, if anammox and partial denitrification are combined, while saving additional dosing of carbon sources, the nitrate nitrogen produced by anammox can be further removed by means of denitrification, and theoretically 100% nitrogen removal can be achieved, making nitrate supply more stable.

Therefore, the present invention develops a two-stage nitrogen removal process based on a partial denitrification-anammox reaction, which can improve the nitrogen removal performance of the system while realizing efficient utilization of organic matters in domestic sewage. In addition, the present invention has the advantages of low energy consumption and low treatment cost.

SUMMARY

Provided in the present invention is a device and method for treating urban domestic sewage based on a two-stage combined process of partial denitrification-anammox, aiming at solving the problem of insufficient carbon sources in the traditional sewage treatment process, while improving the nitrogen removal rate.

A device for treating urban domestic sewage based on a two-stage combined process of partial denitrification-anammox, where the device is provided with a raw water tank (1), a sequencing batch biofilm reactor (SBBR) (2), an intermediate water tank (3), an up-flow anaerobic sludge bed (UASB) (4) and a water outlet tank (5); the raw water tank (1) being provided with an inlet pump I (1.1) and an inlet pump II (1.2); the SBBR (2) being provided with a stirring device (2.1), a gas flow meter (2.2), an aeration pump (2.3), an aeration plate (2.4), a pH probe (2.5), a DO probe (2.6), a bio-carriers frame (2.7), bio-carriers (2.8) and a drain valve (2.9); the intermediate water tank (3) being provided with an inlet pump III (3.1); and a UASB reactor (4) being provided with a pH probe (4.1), a DO probe (4.2), a water inlet (4.3), a gas collection port (4.4) and a water outlet (4.5);

the raw water tank (1) is connected to the water inlet of the SBBR (2) via the inlet pump I (1.1), and is connected to the water inlet (4.4) of the UASB (4) via the inlet pump II (1.2); the SBBR (2) is connected to the intermediate water tank (3) via the drain valve (2.9); the water inlet (4.3) of the UASB (4) is connected to the intermediate water tank (3) via the inlet pump III (3.1); and the UASB (4) is connected to the water outlet tank (5) via the water outlet (4.5).

A method for treating urban domestic sewage based on a two-stage combined process of partial denitrification-anammox by applying the device, where the method includes the following steps of:

1) SBBR Startup:

1.1) startup of a partial denitrification-nitrification reaction: the nitrification sludge of an actual urban sewage treatment plant is used as seed sludge for injection into the SBBR (2), with a sludge concentration of 2500-4000 mg/L; the synthetic wastewater is used as influent water, with the concentration of NH4+-N in the synthetic wastewater being 40-60 mg/L, and COD being 200-300 mg/L; the synthetic wastewater is injected into the SBBR (2) via the inlet pump II (1.2), with a water inlet time of 5-10 min; the stirring device (2.1) of the SBBR is operated to realize full mixing of sludge and liquid, with a stirring time of 40-80 min; the aeration pump (2.2) is started to aerate for 60-80 min, the DO is maintained at 0.3-0.5 mg/L, and the pH value is maintained at 6.5-8.5 during the aeration; and then a supernatant is discharged into the intermediate water tank (3) after precipitation for 20-30 min and drainage for 5-10 min, with the drainage ratio of the SBBR being 0.3-0.5; the reactor runs 6-8 cycles per day, with an idle time of 30-110 min per cycle; when the phenomenon of partial denitrification occurs at the stirring stage of the reactor, that is, in the presence of nitrate nitrogen being 5-10 mg/L, and the ammonia oxidation rate reaches more than 90% in the subsequent aeration stage, i.e., the nitrate nitrogen concentration reaches 20-30 mg/L, which can be maintained for more than 10 days, and then the startup is considered to be completed; and 1.2) startup of an anammox reaction: anammox bacteria attached to the bio-carriers (2.7) are inoculated in the SBBR (2); the filling ratio of the bio-carriers (2.7) is 20%-30% of that in the SBBR; at the same time, the stirring time is prolonged to make the SBBR reactor (2) operate in a way of water feeding for 5-10 min, stirring for 140-220 min, aeration for 60-80 min, sedimentation for 20-30 min, water discharge for 5-10 min and standing idle for 10 min, the reactor runs 4-6 cycles per day, DO is maintained at 0.3-0.5 mg/L, and pH value is maintained at 6.5-8.5 during the aeration; when the ammonia nitrogen concentration in SBBR at the end of stirring is decreased by 5-10 mg/L compared with that at the beginning of stirring, the nitrate nitrogen concentration is reduced to be less than 1 mg/L at the same time, and the ammonia oxidation rate of the remaining ammonia nitrogen at the end of the aeration stage reaches more than 90%, that is, when the nitrate nitrogen concentration reaches 10-20 mg/L, the startup is considered to be successful;

2) UASB startup: the UASB (4) is started at the same time as the SBBR is started; the sludge inoculated in UASB (4) is from partial denitrification-anammox reactor in a long-term operation, and the sludge concentration after the inoculation is 2000-3000 mg/L; the influent water of the UASB (4) is divided into two parts, in which one part is nitrate nitrogen-containing effluent of the SBBR (2), the other part is synthetic wastewater with the NH4+-N concentration of 40-60 mg/L and COD concentration of 200-300 mg/L, the two enter the UASB (4) in the ratio of 2:1-3:1 by volume, the ammonia nitrogen concentration in the influent water of the UASB (4) is controlled to be 10-20 mg/L, and the nitrate nitrogen concentration to be 10-20 mg/L; the hydraulic retention time is 180-240 min; the sludge is not actively discharged during the operation, and the startup is considered to be successful when the ammonia nitrogen and nitrate nitrogen in the effluent drop below 5 mg/L; and 3) SBBR-UASB operation: the SBBR reactor (2) is operated in a way of keeping water feeding for 5-10 min, stirring for 140-220 min, aeration for 60-80 min, sedimentation for 20-30 min, water discharge for 5-10 min, and standing idle for 10 min, and the reactor runs 4-6 cycles per day; during the aeration, DO is maintained at 0.3-0.5 mg/L; the UASB runs continuously with a volume ratio of 2:1-3:1 between artificial wastewater and nitrate nitrogen-containing effluent of the SBBR, and when the total nitrogen in the effluent falls below 5 mg/L, the nitrogen removal is considered to be successful.

To sum up, according to the device and method for treating urban domestic sewage based on a two-stage combined process of partial denitrification-anammox, the process is as follows: synthetic wastewater enters the SBBR from a water inlet device, denitrification and partial denitrification occur during the stirring state to consume organic matters and convert the remaining nitrate nitrogen in the previous cycle into mostly nitrogen and partly nitrite nitrogen, and then the generated nitrite nitrogen and a part of the ammonia nitrogen undergo an anammox reaction; the remaining ammonia nitrogen at the aeration stage is then converted into nitrate nitrogen under the action of nitrifying bacteria, which is discharged to the intermediate water tank as a part of the influent water of the UASB; synthetic wastewater and nitrate nitrogen-containing effluent of the SBBR enter the UASB in proportion to each other, a partial denitrification occurs to consume a part of the organic matters and convert nitrate to nitrite nitrogen, and nitrite nitrogen and ammonia nitrogen are removed by means of the anammox reaction, where the nitrate produced can be converted into nitrite again through a partial denitrification, so as to provide a substrate for anammox.

Compared with the prior art, the present invention has the following advantages of:

(1) making full use of organic matters in water as carbon sources, and converting nitrate into nitrite to provide a substrate for anammox;

(2) effectively utilizing by-products of anammox through the partial denitrification to improve the nitrogen removal efficiency; and (3) providing a nitrate nitrogen substrate in a way of nitrification plus partial denitrification, thereby making the system more stable.

BRIEF DESCRIPTION OF THE DRAWINGS

FIG. 1 is the device structure diagram of the present invention:

In the FIGURE, a raw water tank (1), a sequencing biofilm batch reactor (SBBR) (2), an intermediate water tank (3), an up-flow anaerobic sludge blanket (UASB) (4) and a water outlet tank (5) are provided, where the raw water tank (1) is provided with an inlet pump I (1.1) and an inlet pump II (1.2); the SBBR (2) is provided with a stirring device (2.1), a gas flow meter (2.2), an aeration pump (2.3), an aeration plate (2.4), a pH probe (2.5), a DO probe (2.6), a packing frame (2.7), a packing (2.8) and a drain valve (2.9); the intermediate water tank (3) is provided with an inlet pump III (3.1); and a UASB reactor (4) is provided with a pH probe (4.1), a DO probe (4.2), a water inlet (4.3), a gas collection port (4.4) and a water outlet (4.5);

the raw water tank (1) is connected to the water inlet of the SBBR (2) via the inlet pump I (1.1), and is connected to the water inlet (4.4) of the UASB (4) via the inlet pump II (1.2); the SBBR (2) is connected to the intermediate water tank (3) via the drain valve (2.9); the water inlet (4.3) of the UASB (4) is connected to the intermediate water tank (3) via the inlet pump III (3.1); and the UASB (4) is connected to the water outlet tank (5) via the water outlet (4.5).

SPECIFIC EMBODIMENTS

Referring to the test device shown in FIG. 1, implementation is done according to the following steps:

1) SBBR startup: 1.1) startup of a partial denitrification-nitrification reaction: the nitrification sludge from an actual urban sewage treatment plant is used as seed sludge for injection into the SBBR (2), with a sludge concentration of 3000 mg/L; the synthetic wastewater is used as influent water, with the concentration of NH4+-N in the synthetic wastewater being 60 mg/L, and COD concentration being 250 mg/L; the synthetic wastewater is injected into the SBBR (2) via the inlet pump II (1.2), with the water inlet time of 5 min; the stirring device (2.1) of the SBBR is operated to realize full mixing of sludge and liquid, with a stirring time of 60 min; the aeration pump (2.2) is started to aerate for 60 min, the DO is maintained at 0.5 mg/L, and the pH value is maintained at 6.5-8.5 during the aeration; and then a supernatant is discharged into the intermediate water tank (3) after precipitation for 30 min and drainage for 5 min, with the drainage ratio of the SBBR being 0.5; the reactor runs 8 cycles per day, with an idle time of 80 min per cycle; and after running for a period of time, the phenomenon of partial denitrification occurs at the stirring stage of the reactor, that is, in the presence of nitrate nitrogen being 5-10 mg/L, and the ammonia oxidation rate reaches more than 90% in the subsequent aeration stage, i.e., the nitrate nitrogen concentration falls below 30 mg/L, and a stable operation for more than 10 days can be maintained;

1.2) startup of an anammox reaction:anammox bacteria attached to the bio-carriers (2.7) are inoculated in the SBBR (2); the filling ratio of the bio-carriers (2.7) is 20% of that in the SBBR; at the same time, the stirring and aeration time is prolonged to make the SBBR reactor (2) operate in a way of water feeding for 5 min, stirring for 220 min, aeration for 80 min, sedimentation for 30 min, water discharge for 5 min and standing idle for 40 min, the reactor runs 4 cycles per day, DO is maintained at 0.3 mg/L, and pH value is maintained at 6.5-8.5 during the aeration; and when the ammonia nitrogen concentration in SBBR at the end of stirring is decreased by 5-10 mg/L compared with that at the beginning of stirring and nitrate nitrogen is completely removed, the ammonia oxidation rate of the remaining ammonia nitrogen at the end of the aeration stage reaches more than 90%, that is, the nitrate nitrogen concentration reaches 20-25 mg/L;

2) UASB startup: the UASB (4) is started at the same time as the SBBR is started; the sludge inoculated in UASB (4) is from partial denitrification-anammox reactor in a long-term operation, and the sludge concentration after the inoculation is 2000 mg/L; the influent water of the UASB (4) is divided into two parts, in which one part is nitrate nitrogen-containing effluent of the SBBR (2), the other part is synthetic wastewater with the NH4+-N concentration of 60 mg/L and COD concentration of of 250 mg/L, the two enter the UASB (4) in the ratio of 3:1 by volume, so that the concentrations of ammonia nitrogen and nitrate nitrogen in the influent water of the UASB (4) are both 20-25 mg/L; the hydraulic retention time is 360 min; the sludge is not actively discharged during the operation; and after the operation for a period of time, ammonia nitrogen and nitrate nitrogen in the effluent of the UASB are decreased; and 3) SBBR-UASB operation: the SBBR reactor (2) is operated in a way of keeping water feeding for 5 min, stirring for 220 min and aeration for 80 min, and during the aeration, the reactor runs in a way of maintaining DO at 0.3 mg/L, sedimentation for 30 min, water discharge for 5 min and standing idle for 10 min, and the reactor runs 4 cycles per day; the UASB runs continuously with a volume ratio of 3:1 between artificial wastewater and nitrate nitrogen-containing effluent of the SBBR, and when the total nitrogen in the effluent falls below 5 mg/L from 40 mg/L-50 mg/L, successful nitrogen removal of urban domestic wastewater is achieved.

What is claimed is:

1. A device for treating urban domestic sewage based on a two-stage combined process of partial denitrification-anammox, wherein a raw water tank (1), a sequencing batch biofilm reactor (SBBR) (2), an intermediate water tank (3), an up-flow anaerobic sludge bed (UASB) (4) and a water outlet tank (5) are provided, the raw water tank (1) being provided with an inlet pump I (1.1) and an inlet pump II (1.2); the SBBR (2) being provided with a stirring device (2.1), a gas flow meter (2.2), an aeration pump (2.3), an aeration plate (2.4), a pH probe (2.5), a DO probe (2.6), a packing frame (2.7), a packing (2.8) and a drain valve (2.9); the intermediate water tank (3) being provided with an inlet pump III (3.1); and a UASB reactor (4) being provided with a pH probe (4.1), a DO probe (4.2), a water inlet (4.3), a gas collection port (4.4) and a water outlet (4.5); the raw water tank (1) is connected to a water inlet of the SBBR (2) via the inlet pump I (1.1), and is connected to the water inlet (4.4) of the UASB (4) via the inlet pump II (1.2); the SBBR (2) is connected to the intermediate water tank (3) via the drain valve (2.9); the water inlet (4.3) of the UASB (4) is connected to the intermediate water tank (3) via the inlet pump III (3.1); and the UASB (4) is connected to the water outlet tank (5) via the water outlet (4.5).

2. A method for treating urban domestic sewage based on a two-stage combined process of partial denitrification-anammox by applying the device according to claim 1, wherein the method comprises the following steps of: 1) SBBR startup: 1.1) startup of a partial denitrification-nitrification reaction: a nitrification sludge from an actual urban sewage treatment plant is used as seed sludge for injection into the SBBR (2), with a sludge concentration of 2500-4000 mg/L; synthetic wastewater is used as influent water, with a concentration of NH4+-N in the synthetic wastewater being 40-60 mg/L, and COD concentration being 200-300 mg/L; the synthetic wastewater is injected into the SBBR (2) via the inlet pump II (1.2), with a water inlet time of 5-10 min; the stirring device (2.1) of the SBBR is operated to realize full mixing of sludge and liquid, with a stirring time of 40-80 min; the aeration pump (2.3) is started to aerate for 60-80 min, a DO is maintained at 0.3-0.5 mg/L, and the pH value is maintained at 6.5-8.5 during the aeration; and then a supernatant is discharged into the intermediate water tank (3) after precipitation for 20-30 min and drainage for 5-10 min, with the drainage ratio of the SBBR being 0.3-0.5; the reactor runs 6-8 cycles per day, with an idle time of 30-110 min per cycle; when a phenomenon of partial denitrification occurs at a stirring stage of the reactor, that is, in a presence of nitrate nitrogen being 5-10 mg/L, and an ammonia oxidation rate reaches more than 90% in the subsequent aeration stage, the nitrate nitrogen concentration reaches 20-30 mg/L, which can be maintained for more than 10 days, and then the startup is considered to be completed; and 1.2) startup of an anammox reaction:anammox bacteria attached to the packing (2.8) are inoculated in the SBBR (2); the filling ratio of the packing (2.8) is 20%-30% of that in the SBBR; at the same time, the stirring time is prolonged to make the SBBR reactor (2) operate in a way of water feeding for 5-10 min, stirring for 140-220 min, aeration for 60-80 min, sedimentation for 20-30 min, water discharge for 5-10 min and standing idle for 10 min, the reactor runs 4-6 cycles per day, DO is maintained at 0.3-0.5 mg/L, and pH value is maintained at 6.5-8.5 during the aeration; and when an ammonia nitrogen concentration in SBBR at the end of stirring is decreased by 5-10 mg/L compared with that at the beginning of stirring, the nitrate nitrogen concentration is reduced to be less than 1 mg/L at the same time, and the ammonia oxidation rate of the remaining ammonia nitrogen at the end of the aeration stage reaches more than 90%, that is, when the nitrate nitrogen concentration reaches 10-20 mg/L, the startup is considered to be successful; 2) UASB startup: the UASB (4) is started at the same time as the SBBR is started; the sludge inoculated in the UASB (4) is from partial denitrification-anammox reactor in a long-term operation, and the sludge concentration after the inoculation is 2000-3000 mg/L; an influent water of the UASB (4) is divided into two parts, in which one part is nitrate nitrogen-containing effluent of the SBBR (2), the other part is artificial wastewater with the NH4+-N concentration of 40-60 mg/L and COD concentration of 200-300 mg/L, the two parts enter the UASB (4) in the ratio of 2:1-3:1 by volume, the ammonia nitrogen concentration in the influent water of the UASB (4) is controlled to be 10-20 mg/L, and the nitrate nitrogen concentration to be 10-20 mg/L; the hydraulic retention time is 180-240 min; and the sludge is not actively discharged during the operation, and the startup is considered to be successful when the ammonia nitrogen and nitrate nitrogen in the effluent drop below 5 mg/L; and 3) SBBR-UASB operation: the SBBR reactor (2) is operated in a way of keeping water feeding for 5-10 min, stirring for 140-220 min, aeration for 60-80 min, sedimentation for 20-30 min, water discharge for 5-10 min and standing idle for 10 min, and the reactor runs 4-6 cycles per day; during the aeration, DO is kept at 0.3-0.5 mg/L; the UASB runs continuously with a volume ratio of 2:1-3:1 between artificial wastewater and nitrate nitrogen-containing effluent of the SBBR, and when the total nitrogen in the effluent falls below 5 mg/L, nitrogen removal is considered to be successful.

* * * * *